United States Patent
Mate et al.

(10) Patent No.: US 10,424,307 B2
(45) Date of Patent: Sep. 24, 2019

(54) ADAPTING A DISTRIBUTED AUDIO RECORDING FOR END USER FREE VIEWPOINT MONITORING

(71) Applicant: Nokia Technologies Oy, Espoo (FI)

(72) Inventors: Sujeet Shyamsundar Mate, Tampere (FI); Lasse Juhani Laaksonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/397,008

(22) Filed: Jan. 3, 2017

(65) Prior Publication Data
US 2018/0190300 A1 Jul. 5, 2018

(51) Int. Cl.
*G10L 19/008* (2013.01)
*H04S 3/00* (2006.01)
*H04S 7/00* (2006.01)
*G10L 19/24* (2013.01)

(52) U.S. Cl.
CPC ............ *G10L 19/008* (2013.01); *H04S 3/008* (2013.01); *H04S 7/304* (2013.01); *G10L 19/24* (2013.01); *H04S 2400/03* (2013.01); *H04S 2400/15* (2013.01)

(58) Field of Classification Search
CPC ... G10L 19/008; H04S 3/008; H04S 2400/15; H04S 2400/03; H04S 7/304
USPC .......................................................... 381/2
See application file for complete search history.

(56) References Cited

U.S. PATENT DOCUMENTS

| 9,165,558 B2 | 10/2015 | Dressler et al. |
| 9,167,346 B2 | 10/2015 | Kraemer et al. |
| 9,167,356 B2 | 10/2015 | Kraemer et al. |
| 9,456,273 B2 | 9/2016 | Wang et al. |
| 2011/0002469 A1 | 1/2011 | Ojala |
| 2013/0297053 A1* | 11/2013 | Ojanpera ............ G06F 17/3074 700/94 |
| 2014/0270263 A1 | 9/2014 | Fejzo et al. |

(Continued)

FOREIGN PATENT DOCUMENTS

| WO | WO-03058473 A1 | 7/2003 |
| WO | WO-2012098425 A1 | 7/2012 |
| WO | WO-2013142642 A1 | 9/2013 |

OTHER PUBLICATIONS

Sporer, Thomas, et al., "Localization of Audio Objects in Multi-channel Reproduction Systems", AES 57th International Conference: The Future of Audio Entertainment Technology—Cinema, Television and the Internet, Mar. 2015, http://www.aes.org/e-lib/browse.cfm?elib=17613; 4 pgs.

*Primary Examiner* — Paul Kim

(74) *Attorney, Agent, or Firm* — Harrington & Smith

(57) ABSTRACT

An audio scene is captured in multiple audio channels by distributed microphones. Based on at least one of a viewpoint of a user and at least one preference of a user, two or more of those multiple audio channels are selected from among those multiple audio channels; those selected two or more audio channels are prioritized based on at least one of preferences of the user, requirements of a software application of a device operated by the user, and requirements of operating conditions of the device. After that prioritizing, at least one of the selected two or more audio channels is encoded into a coded monitor mix; which is sent to the device over a transmission link.

20 Claims, 8 Drawing Sheets

(56) References Cited

U.S. PATENT DOCUMENTS

2014/0297296 A1  10/2014  Koppens et al.
2016/0300577 A1  10/2016  Fersch et al.

* cited by examiner

ADAPTING A DISTRIBUTED AUDIO RECORDING FOR END USER FREE VIEWPOINT MONITORING

TECHNOLOGICAL FIELD

The described invention relates to processing of multiple audio channels such as for presentation to a user as free viewpoint audio, and more specifically concern such processing for the purpose of delivery through a wireless network to a consumer device such as a smartphone or headset rendering a virtual reality experience that has limited audio processing capabilities.

BACKGROUND

Embodiments of the teachings herein relate to live monitoring of audio captured by multiple spatially distributed microphones. Such captured audio may be used for live-streaming for presentation within an augmented reality or virtual reality context, or may be stored for later rending in that regard. The audio is captured preferably by multiple close-up microphones that are close to and capture the sound sources of interest, and multiple microphone arrays that capture a fuller background integration. The close-up microphones may be tracked in order to facilitate realistic rendering of the tracked sound sources in the final mix.

Consider an example of a musical concert; there may be a close-up microphone near each member of the band who is playing a different musical instrument and/or vocalizing, and further microphone arrays dispersed about the stage and among the concert hall. With recording capability being ubiquitous in personal mobile phones, the close-up microphones may be smartphones themselves and there may be further non-array microphones among the audience that capture sound that is incorporated into the final mix. Capturing a sound environment in this manner can then be processed so as to be presented to a listener as if that listener were are any location, not limited to the specific locations of the microphones themselves; this flexibility in the audio experience presented to the user is considered a free viewpoint (FVP) system.

FIG. 1 illustrates an example of an audio environment with multiple dispersed microphones capturing sound that may serve as the audio input to a FVP system. Positions 1-10 represent close-up microphones, each generating their own audio channel. In some embodiments, at least some of these microphones may generate more than one channel. For example, a stereo microphone may be utilized. Assuming the sound environment is a musical concert positions 1-10 may be positioned near each different band member (guitarist, drummer, lead singer, backup singers, etc.). Positions $OP_1$-$OP_7$ designate microphone arrays and ideally are positioned at locations deemed to best capture the overall audio environment including ambiance. As one non-limiting example each of these can be implemented as a Nokia OZO camera, which has a 360° camera view and omnidirectional audio from 8 microphones (see https://ozo.nokia.com/, last visited Nov. 25, 2016). This environment yields a total of 66 audio channels: 10 from the close-up microphones and 56 OZO channels from the 7 different OZO arrays. If all these channels are processed and transmitted individually to a consumer device over an unmanaged Internet-protocol (IP) network such as a wireless local area network (WLAN), the receiving device will find it difficult (depending on the resource availability) to handle all the content, and further the quality of the WLAN channels over which this content is uplinked, and of the cellular or other WLAN channel over which it is downlinked to the end user, changes dynamically. The difficulties lie in network congestion and latency requirements of the audio being delivered. Embodiments of these teachings are directed to managing this audio content to optimize the end user experience under these conditions of high data volume and unstable radio channel quality.

The currently available solutions that are workable for a FVP audio environment are generally devoted towards dedicated professional hardware over managed audio over IP networks which transmit audio data in a lossless manner. But this is not suitable for prosumer or consumer applications not having access to expensive professional audio equipment and infrastructure. Some relevant prior art teachings can be seen at U.S. Pat. No. 8,856,049 (co-owned), U.S. Pat. Nos. 9,167,346 and 9,165,558; and at US Patent Application Publication Nos. 2016/0300577 and 2011/0002469.

SUMMARY

According to a first aspect of these teachings there is a method comprising: based on at least one of a viewpoint of a user and at least one preference of a user, selecting two or more audio channels from among multiple audio channels captured by distributed microphones; prioritizing the selected two or more audio channels based on at least one of preferences of the user, requirements of a software application of a device operated by the user, and requirements of operating conditions of the device; after the prioritizing encoding at least one of the selected two or more audio channels into a coded monitor mix; and sending the coded monitor mix to the device over a transmission link.

According to a second aspect of these teachings there is an audio processing system comprising at least one memory storing computer program instructions, and at least one processor. In this aspect the at least one memory with the computer program instructions is configured with the at least one processor to cause the audio processing system to perform actions comprising: based on at least one of a viewpoint of a user and at least one preference of a user, select two or more audio channels from among multiple audio channels captured by distributed microphones; prioritize the selected two or more audio channels based on at least one of preferences of the user, requirements of a software application of a device operated by the user, and requirements of operating conditions of the device; after the selected two or more channels are prioritized, encode at least one of the selected two or more audio channels into a coded monitor mix; and send the coded monitor mix to the device over a transmission link.

According to a third aspect of these teachings there is a computer readable memory tangibly storing computer program instructions that, when executed by one or more processors, cause a host audio system to perform actions comprising: based on at least one of a viewpoint of a user and at least one preference of a user, select two or more audio channels from among multiple audio channels captured by distributed microphones; prioritize the selected two or more audio channels based on at least one of preferences of the user, requirements of a software application of a device operated by the user, and requirements of operating conditions of the device; after the selected two or more channels are prioritized, encode at least one of the selected two or more audio channels into a coded monitor mix; and send the coded monitor mix to the device over a transmission link.

DETAILED DESCRIPTION

Embodiments of these teachings concern high quality low latency live monitoring of free viewpoint audio for audio scenes being captured from multiple microphones. More specifically, embodiments described herein present a method for delivering a coded monitor mix with high quality and low latency over a transmission link of a conventional IP network which inherently can have variations in bandwidth and latency, and which can be rendered by a consumer device such as a smartphone that is constrained in its audio processing capabilities. The coded monitor mix is the digital audio file that is presented to the end user at his/her smartphone, headset or other consumer device. In the FIG. 1 example the monitor mix is taken from the original raw 66 audio channels and processed based on the user's preferences and needs (context), the constraints of the device which will present the monitor mix to the user, and the 'virtual' position/viewpoint of the user in the FVP system which as mentioned above is not constrained by any of the actual positions of the microphones recording that raw audio. As will be detailed further below, an important aspect of these teachings lay in its channel selection and prioritization scheme which is based on viewpoint, context, and the end-user application requirements.

Figure 1:
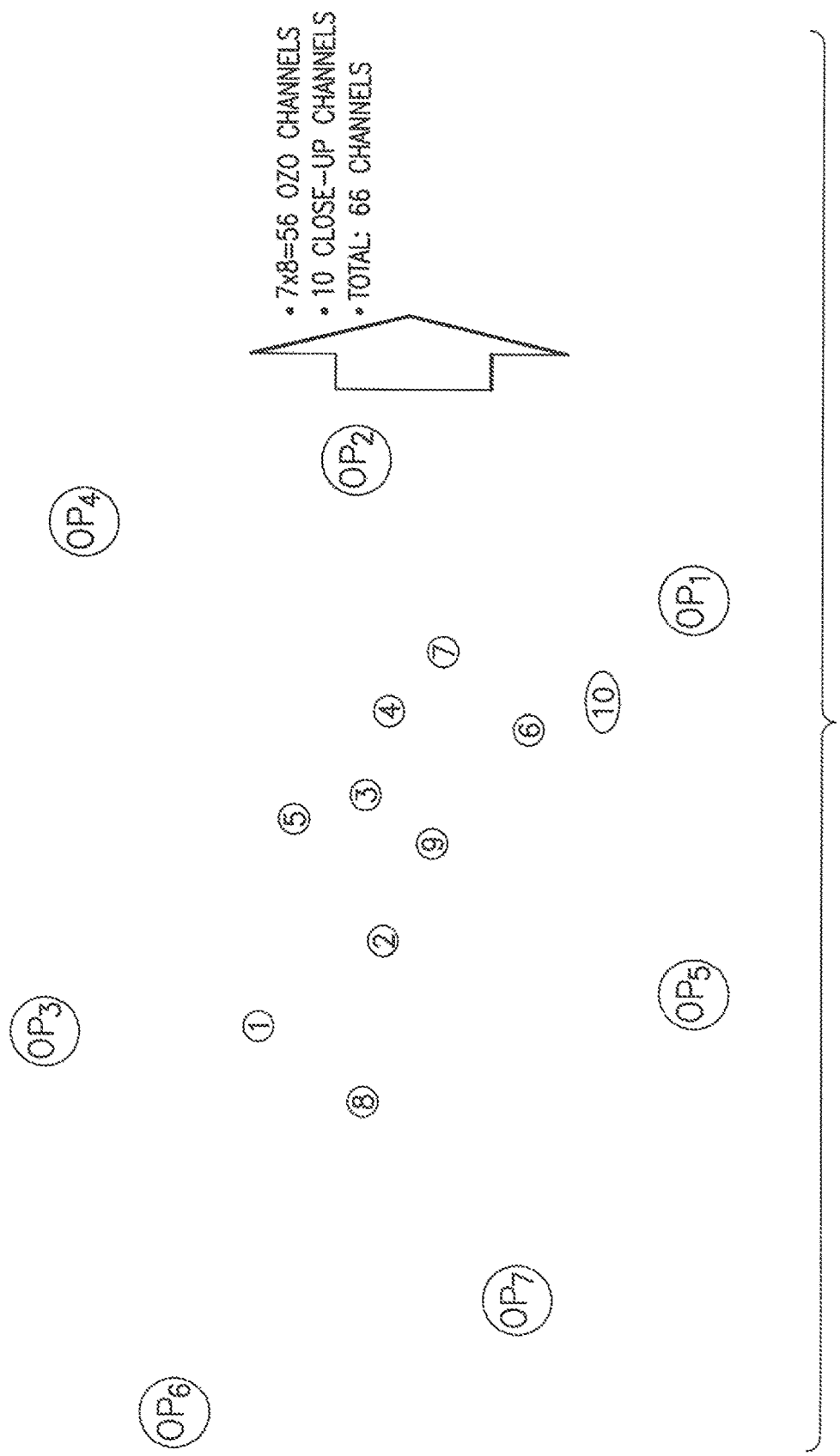
FIG. 1 is a plan view diagram illustrating an example audio environment with multiple dispersed microphones capturing sound that may serve as the audio input for embodiments of these teachings.
Figure 2:
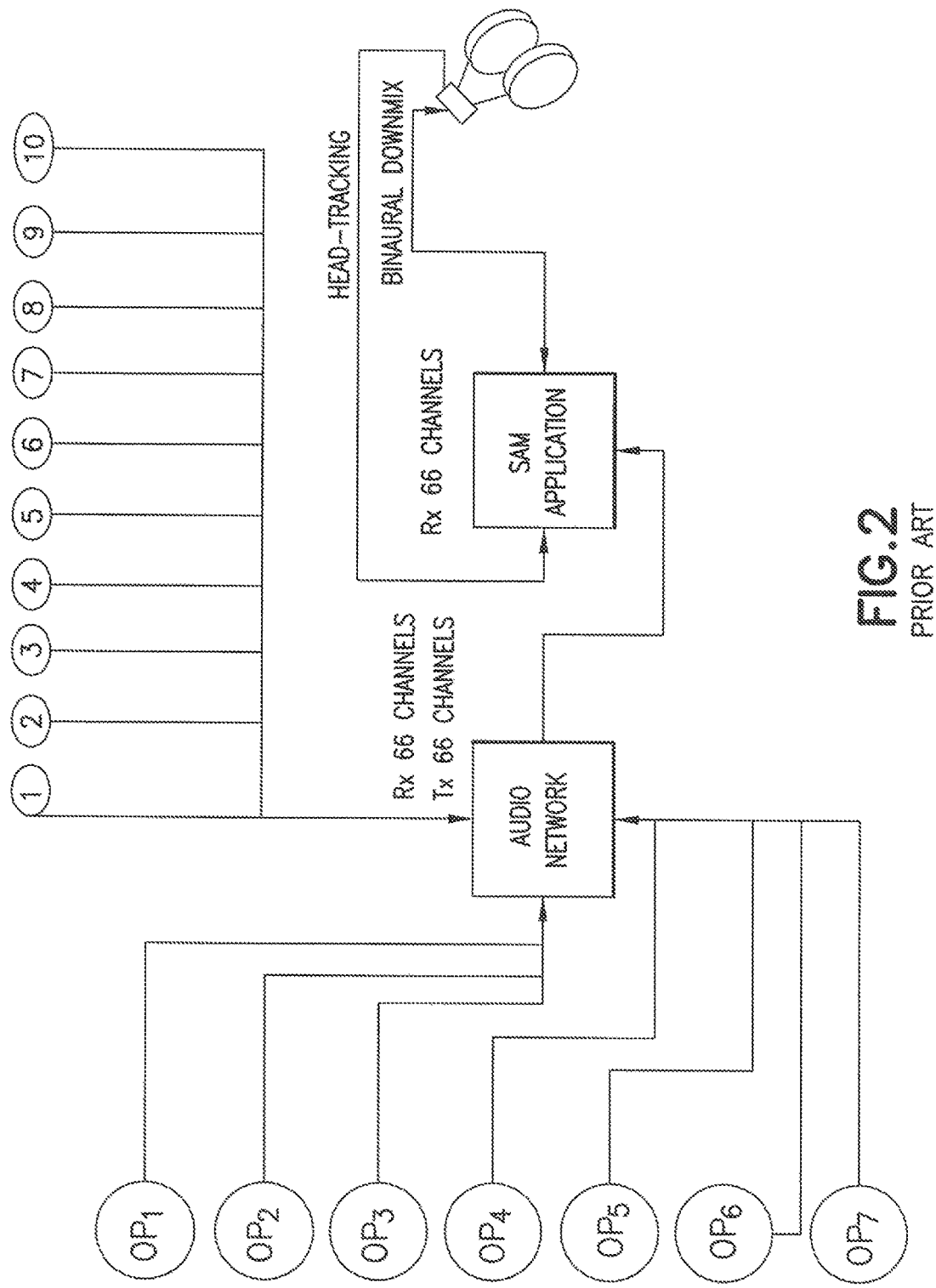
FIG. 2 is a schematic diagram showing how the 66 audio channels captured at FIG. 1 might be rendered to an end-user's virtual reality device.

FIG. 2 is a schematic diagram showing how the 66 audio channels captured at FIG. 1 might be rendered to an end-user's virtual reality device. While the examples herein assume the microphone arrays are implemented by OZO devices, this is simply a practical embodiments but not limiting to the broader teachings herein. There are 66 different audio channels transmitted (TX) by the capture devices/microphones and are captured via the audio network which can be assumed to employ wireless IP radio transmission links; these are the received (RX) 66 channels. Those same 66 channels are then transmitted to a spatial audio processing software application (such as a spatial audio mixer SAM) that is stored on the end-user device and shown again there as receiving 66 RX channels. While some of the transfer from the audio network at the concert hall to the SAM application at the client device may be over an internet backbone, it can be reasonably assumed that at least the last link to the consumer device is wireless. While this last link may be cellular, most typical scenarios would have it as WLAN. The SAM application renders a binaural down-mix to the user's headset, which is dynamically adjusted based on a feedback signal (head-tracking) that relates to physical movement of the user's head so that at any given instant the binaural signal will reflect a given location of the user in the virtual rendering of the FIG. 1 environment which in the above example is assumed to be a concert hall. In the FIG. 2 example a consumer device such as a smartphone would not be able to adequately handle those 66 audio channels; the SAM application would be resident on professional VR equipment that is specifically designed for such a large audio processing load. In other deployments the end user device may be a headset which receives the coded monitor mix, possibly even in analog form, over a transmission link from audio mixing and rendering apparatus. While the examples herein assume the coded monitor mix is sent over a wireless transmission link, in some deployments it may be wired.

Even assuming away any problems in communicating 66 audio channels over dynamically varying wireless channels, this is a substantial amount of real-time processing that must be done at the end-user consumer device. The current trend in virtual reality is to have it rendered by smartphones mounted to specially-adapted headsets and so it is not reasonable to assume the consumer device has the capability to process so many audio channels in real time, particularly when considering the same consumer device will also be simultaneously rendering the video portion of the virtual reality experience. As used herein, consumer device excludes professional-grade dedicated audio equipment.

These teachings concentrate only on the audio rendering but in various deployments of these teachings the audio rendering may be synchronized with a video rendering. As further detailed below, embodiments of these teachings present an intuitive and flexible method for monitoring (that is, receiving and rendering), from a consumer device and over a conventional wireless link, of a complex audio capture scene consisting of dynamic sound sources as well as microphone arrays.

As mentioned above the high number of audio channels corresponding to the audio capture in the free viewpoint space comes with challenges due to network congestion and latency requirements. Blanket compression of a large number of audio channels to reduce the congestion issue, for example at the audio network shown at FIG. 2, can result in sub-optimal audio quality and/or a non-realistic audio monitoring experience for the end user. Latency requirements are inherent in the content to be delivered; like video the audio packets must be re-assembled in a certain chronological order, and for virtual reality application this order must maintain synchronization with the visual scene. Handling a large number of independent network connections generally requires professional equipment which is expensive and often times may be bulky.

Certain embodiments of these teachings provide the following technical effects. They provide a high quality monitoring experience of free viewpoint audio mix. Unlike the legacy SAM scenario generally shown at FIG. 2, these teachings are suitable for a consumer device which cannot handle the large number of individual uncompressed audio channels that would need to be processed, if all of them are transmitted separately. These example embodiments can do so without blanket compression of all the raw audio channels, which can result in sub-optimal audio quality.

More specifically, the examples below embody a viewpoint and context based channel selection, prioritization of channels based on an intended application (in the above concert example these can be, e.g., a guitar monitor, a drums monitor, a production mix and the like) and receiver compliant coding of audio channels, from a free viewpoint capture setup. The audio channels of the monitor mix are coded to meet specific bitrate and latency limits at the receiver user device.

The end result is an intuitive monitoring mix, which is generated in a format suitable for transporting over a transmission link, for example conventional wireless IP networks such as WLAN, and rendered by a resource constrained consumer device. For example, for a user consuming a monitor mix with his/her mobile device such as a smartphone or a tablet. This addresses the application requirements based selection of audio channels, thus minimizing the content to be delivered for a credible monitor mix.

It is known to encode audio (and video) streams in terms of base layers and enhancement layers, where the base layers are the higher priority essential aspects of the data stream and the enhancement layers improve upon the base layer from the perspective of the user experience. In some embodiments of these teachings the monitoring mix is encoded such that, depending on the available bitrate and receiver device resource constraints, the base layer containing the essential aspects are retained but certain less important aspects that are manifest in lower priority audio channels may be skipped from transmission or alternatively encoded at a substantially lower rate. This addresses the fact that over the course of rendering a given event the characteristics of the transmission link such as available bandwidth and transmission latency are likely to change in conventional IP networks.

In one aspect of these teachings there is a coding module that transmits coding metadata and prioritized viewpoint scene information to the receiver/user device. This coding metadata and prioritized viewpoint scene information contains information about the contributing audio channels, and enables the monitoring user device to re-prioritize (based on user preferences) the monitor mix that constitutes the selected audio channels. This feedback allows the user him/her-self to customize or fine tune the monitor mix to suit his/her needs.

Figure 3:
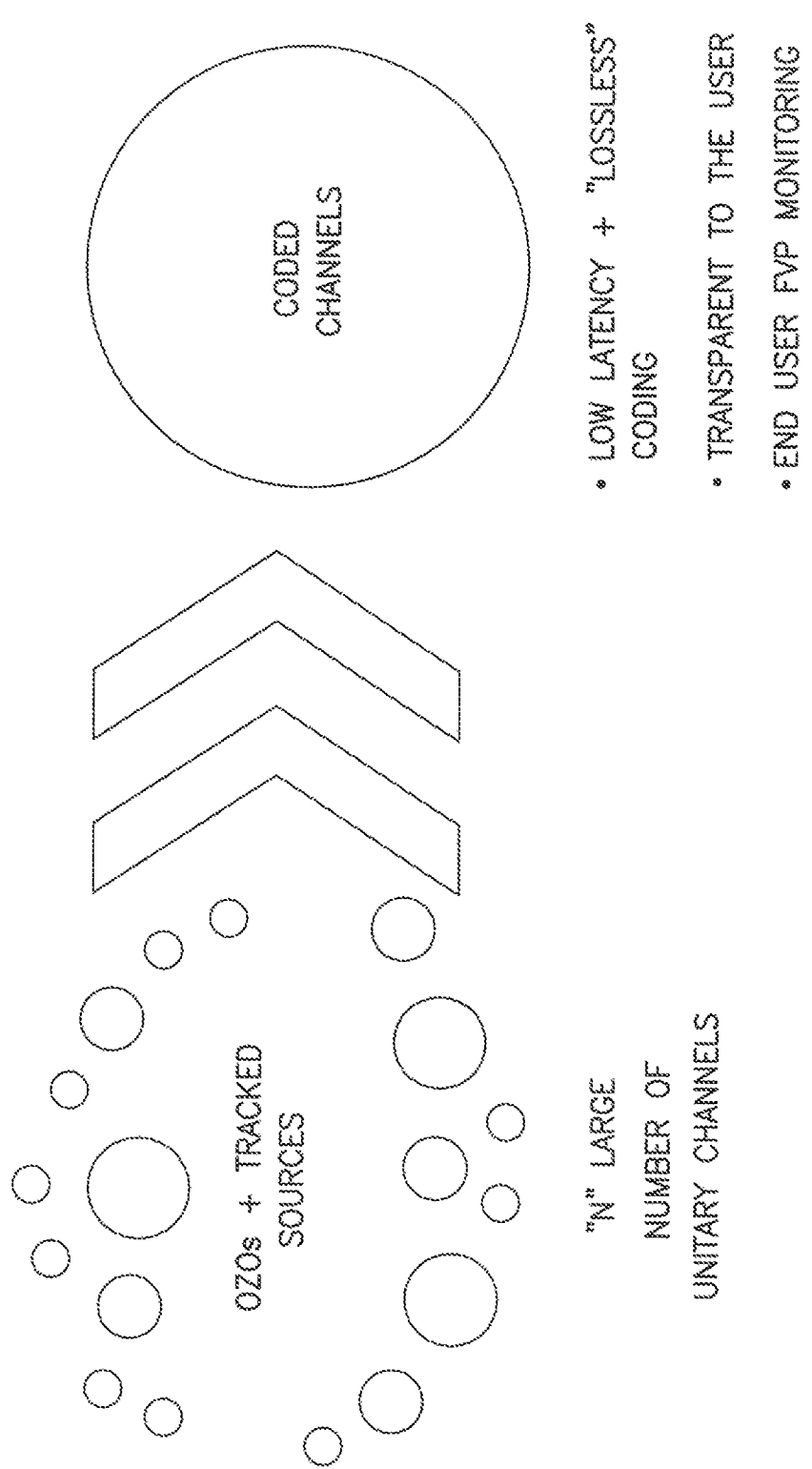
FIG. 3 is a high level schematic diagram illustrating certain goals of generating a low bitrate, low latency and low resource-consuming observation/listening point (OP/LP) specific coded mix of a free viewpoint scene such as the scene in FIGS. 1 and 7.

FIG. 3 is a high level schematic diagram that illustrates the underlying goal of generating a low bitrate, low latency and low resource-consuming observation/listening point (OP/LP) specific coded mix of a free viewpoint scene. With respect to the environment shown at FIG. 1, the various microphones (OZOs and tracked sources) generate 66 audio channels, more generically expressed as some integer number N of unitary audio channels. These are prioritized based on the intended application, and some smaller number of these prioritized N channels are selected based on viewpoint and context. These selected channels are then coded in dependence on the profile/capabilities of the receiving user device. The coding is ideally lossless and low latency as FIG. 3 shows. Some or all of this processing may essentially be transparent to the user experiencing the audio rendering. Other processing may be evident to the user, for example if the user selects for example a guitar viewpoint, or needs to reduce bitrate further.

The overall process can be considered as divided among four distinct steps or processing blocks.
Channel selection based on observation point and listening point.
Prioritization of the selected channels based on the intended application.
Channel prioritization and coding based on the receiver/user device capability.
Delivery (packetization and transport) of the coded monitor mix.

Figure 4:
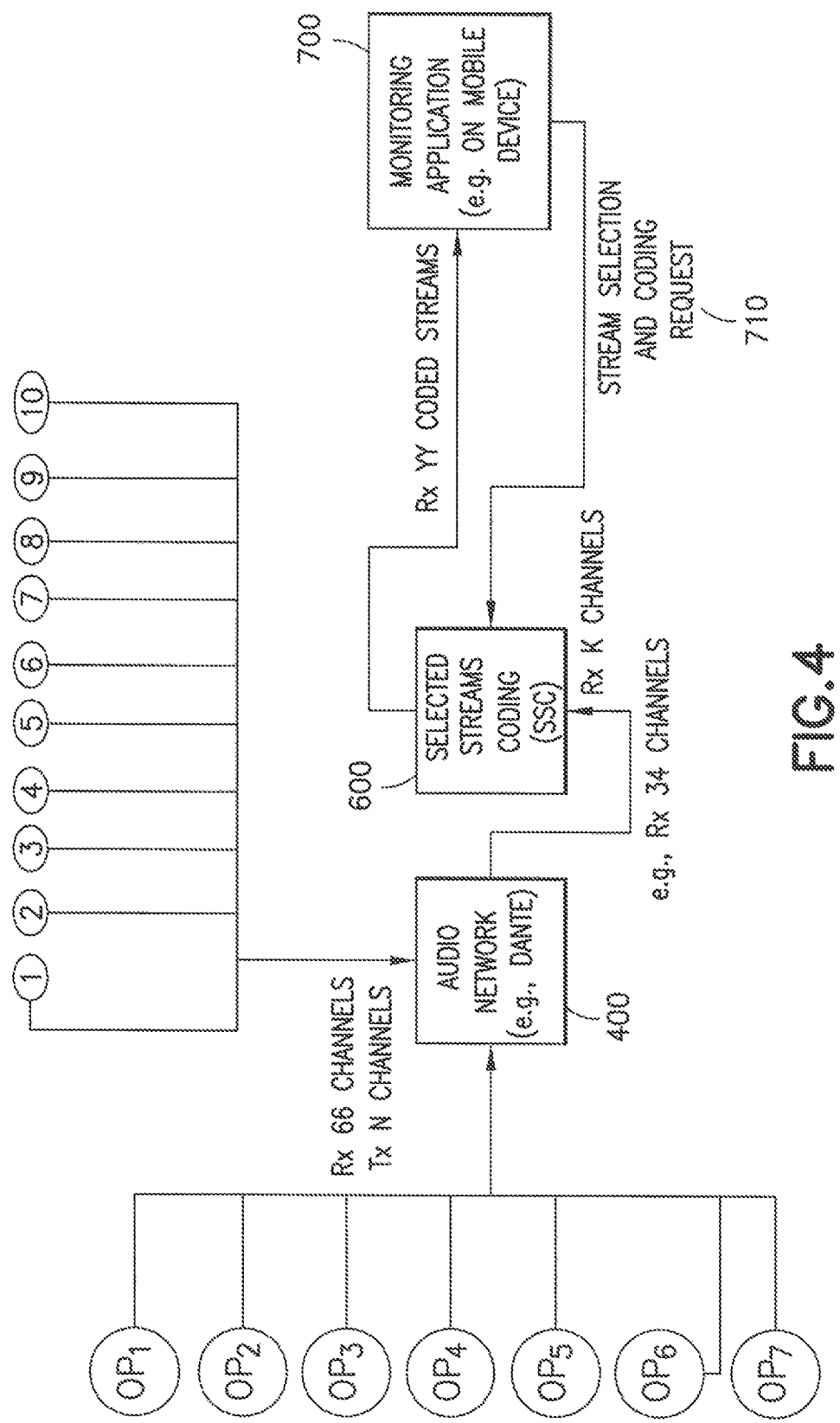
FIG. 4 is a schematic diagram showing how 66 original audio channels are prioritized and processed before being sent to the end user device according to an embodiment of these teachings.
Figure 5:
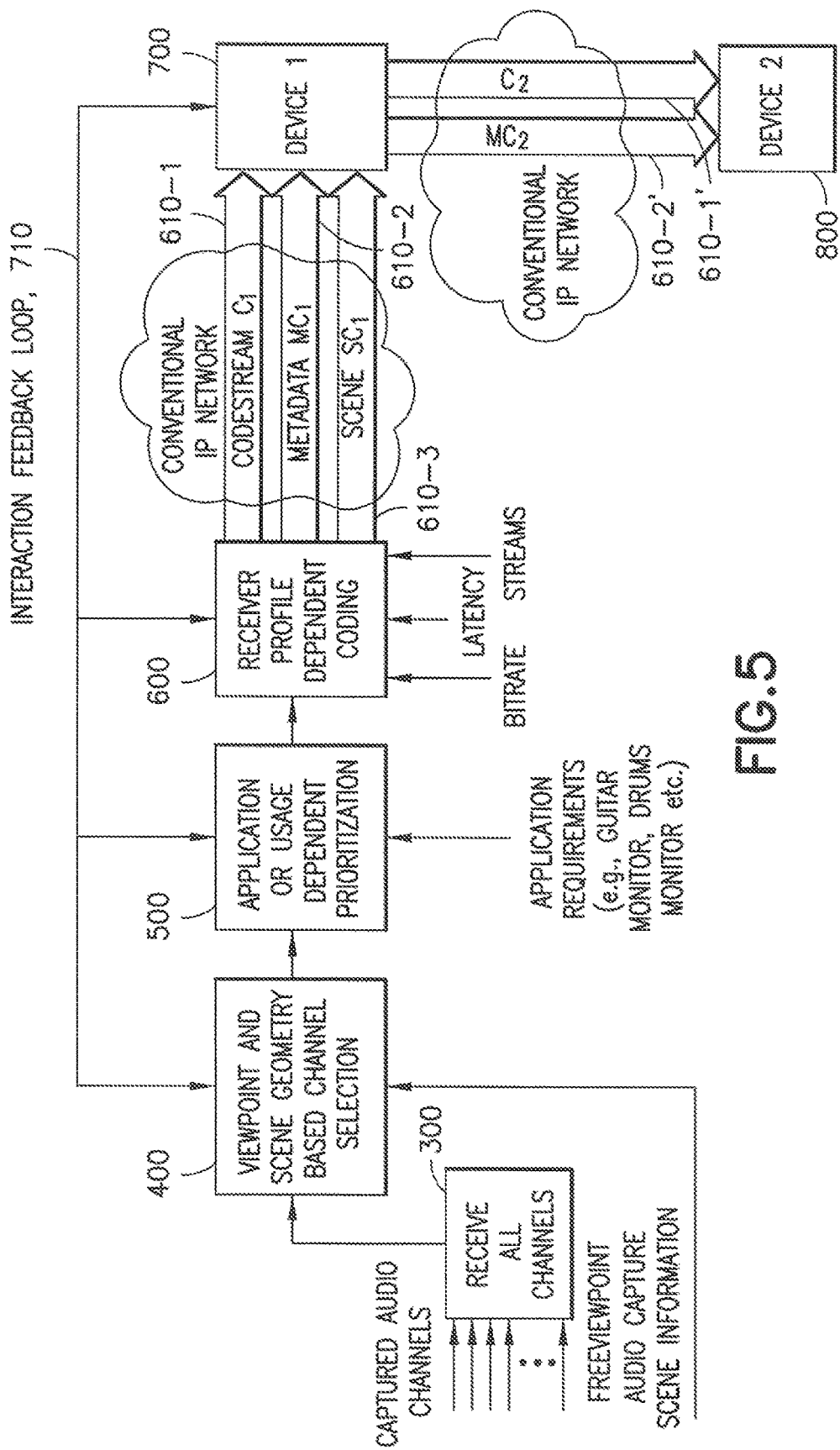
FIG. 5 is similar to FIG. 4 but showing more detail of how the processing is divided into four distinct steps according to an embodiment of these teachings.
Figure 6:
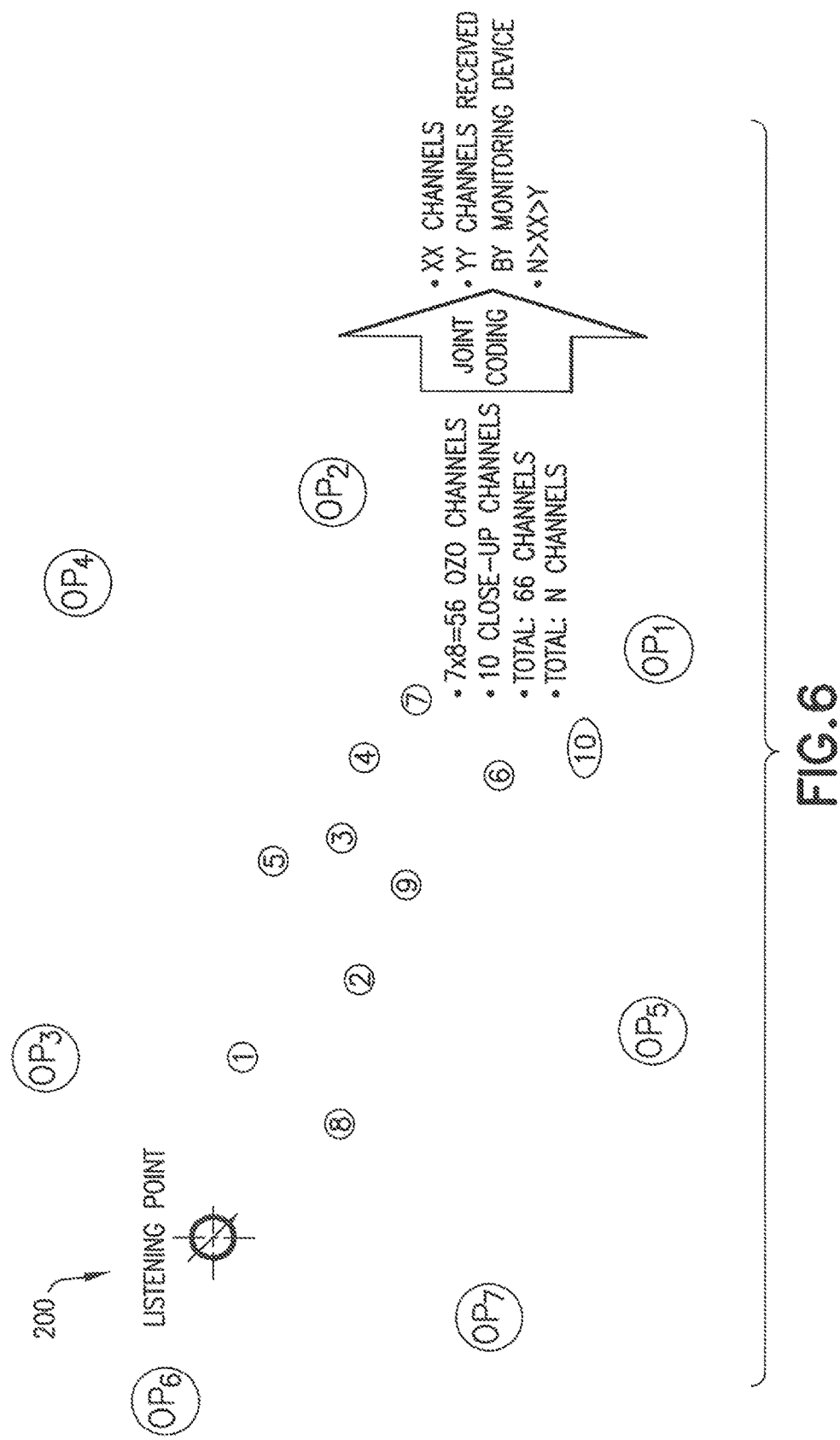
FIG. 6 is similar to FIG. 4 but additionally showing an example listening point (LP) and channel reductions according to embodiments of these teachings.

FIGS. 4-7 illustrate a particular example for the above four steps. Consider a free viewpoint environment at a music concert as mentioned above, with multiple OZO microphone arrays and multiple close-up microphones as shown at FIG. 6, which has them distributed similarly as FIG. 1. For completeness, assume there are various users involved in this free viewpoint audio production who may need to monitor the audio scene on-site as well as off-site. The on-site monitoring should ensure the audio recording or live monitoring latency requirements are satisfied. For example, the different instrument players in the band may have their own mobile device to receive and render the monitor mix which is optimal for their own requirements for live monitoring or when they listen to a recording of their concert afterwards for purposes of self-critique. The different offsite consumers of the monitor mix may be on an Internet connectivity link which may be changing its characteristics, and these users may be listening to the concert live-streamed or listening to an audio monitor mix rendered from the original 66 raw audio channels that were captured and also stored for later use. These teachings are directed to delivering an optimally encoded monitor mix over transmission links, such as those of a conventional IP network, for all of these users.

FIG. 4 is a schematic diagram showing an overall set-up of a free viewpoint distributed audio capture, coding and mobile monitoring at the end user device according to an embodiment of these teachings. The N=66 audio channels that are generated per FIG. 6 via ten individual microphones and seven observation points OPs each having eight microphones in an array are captured at an audio network 400, prioritized and among these prioritized channels a selected number X<N of these audio channels is selected and sent to a selected stream coding (SSC) device 600. The SSC device 600 receives captured audio from the managed audio network 400 and creates the code stream of Y<N channels (and metadata) for transmission to a monitoring application 700 on the end user client device over a transmission link of a conventional wireless IP network. The stream selection and coding by the SSC device 600 depends on feedback 710 from the end user device 700 in the form of a stream selection and coding request 710.

FIG. 5 shows this process in further detail, but first consider a specific example. Each of the ten individual (close-up) microphones in FIG. 6 is represented in the following tables as "Mi" followed by an index number. Each of the seven microphone arrays shown at FIG. 6 as OP (observation point) is represented in the following tables as "OP" followed by an index number. Since each of these OPs represents eight microphones, each outputs eight audio channels as is evident from table 1 below which represents the system setup requirements (where raw bit rate is kbit/s).

TABLE 1

EXAMPLE CAPTURE SETUP CHANNEL CONFIGURATION

| Source | Channels | Raw bit rate |
|---|---|---|
| Mi-01 | 1 | 1152 |
| Mi-02 | 1 | 1152 |
| Mi-03 | 1 | 1152 |
| Mi-04 | 1 | 1152 |
| Mi-05 | 1 | 1152 |
| Mi-06 | 1 | 1152 |
| Mi-07 | 1 | 1152 |
| Mi-08 | 1 | 1152 |
| Mi-09 | 1 | 1152 |
| Mi-10 | 1 | 1152 |
| OP-1 | 8 | 9216 |
| OP-2 | 8 | 9216 |
| OP-3 | 8 | 9216 |
| OP-4 | 8 | 9216 |
| OP-5 | 8 | 9216 |
| OP-6 | 8 | 9216 |
| OP-7 | 8 | 9216 |
| TOTAL | 66 | 76032 |

TABLE 2

EXAMPLE CHANNEL PRIORITY

| Source | Group priority | Priority | Channels | Raw bit rate |
|---|---|---|---|---|
| OP-6 | 1 | 1 | 8 | 9216 |
| OP-3 | 2 | 2 | 8 | 9216 |
| OP-7 | 3 | 3 | 8 | 9216 |
| Mi-08 | 1 | 4 | 1 | 1152 |
| Mi-01 | 2 | 5 | 1 | 1152 |
| Mi-02 | 3 | 6 | 1 | 1152 |
| Mi-05 | 4 | 7 | 1 | 1152 |
| Mi-09 | 5 | 8 | 1 | 1152 |
| Mi-03 | 6 | 9 | 1 | 1152 |
| Mi-04 | 7 | 10 | 1 | 1152 |
| Mi-07 | 8 | 11 | 1 | 1152 |
| Mi-06 | 9 | 12 | 1 | 1152 |
| Mi-10 | 10 | 13 | 1 | 1152 |
| OP-5 | 4 | 14 | 8 | 9216 |
| OP-4 | 5 | 15 | 8 | 9216 |
| OP-1 | 6 | 16 | 8 | 9216 |
| OP-2 | 7 | 17 | 8 | 9216 |
| TOTAL | | | 66 | 76032 |

The first step of the process is selecting X channels from among the total N audio channels based on the observation point or points and the user's (more granular) listening point LP, which is the position in relation to the actual audio environment to which the audio is rendered and is shown at FIG. 6 as LP 200. The listening point LP may correspond to one of the observations points OP. In FIG. 4 the audio network 400 captured these N=66 audio channels and down-selected to X channels; in FIG. 5 these two functions are divided into a receiver 300 that is located at the concert hall and receives the audio channels directly from the various microphones, and a viewpoint/scene based channel selector 400 which may be part of that receiver in the concert hall or may be remote.

The X<N audio channels are selected based on the OP/LP for generating the coded mix. The selected X audio channels (which correspond to the microphone arrays as well as the object/close-up microphones) are chosen based on the location and orientation of the observation point (OP) or listening point (LP) in the free viewpoint capture scene shown by example at FIG. 6. In addition to the OP/LP based selection, contextual information is used to include the audio channels for inclusion in the coded mix. Examples of contextual information include importance of a vocalist or a certain person of importance in the event, exclusion of a microphone array to avoid a particularly noisy part of the event venue, and so forth.

Table 2 below represents an example of such a channel selection where the system has, according to FIG. 6, independently ordered the OP captures and the close-up microphones within these two groups (single microphone Mi priority and separately array OP priority) and Table 2 further shows an overall prioritization. In this example each microphone array is considered as representing only one priority (that is, the eight microphones of one OP are not separately considered for channel priority purposes), but as will be seen below this does not mean any selection or de-selection of a given array must treat all microphones of that array equally.

In this example the arrays OP1 and OP2 are the lowest in overall priority. The selection of N channels can drop these arrays entirely leaving only X=50 audio channels, or alternatively these low-priority arrays can be down-mixed to one (mono) audio channel which would leave X=52 channels. In the prioritization of Table 2, the system has used distance to the listening point 200 to decide the prioritization. However, there could be other rules; for example each close-up microphone could be treated equally by being assigned the same priority. Distance is only one contextual rule for prioritization, some other non-limiting examples are mentioned above.

The second step in the process is prioritizing the selected Y audio channels based on the application requirements which define the constitution of the coded stream. This is application-dependent prioritization, and this prioritization information may be used to arrange the coded streams or stream layers for optimal application-dependent adaptation with the bandwidth and network congestion conditions that are encountered on the transmission links of conventional IP networks such as the wireless Internet over which the stream is downlinked to the end user device 700.

This prioritization information may further be utilized, for example in joint coding of the audio channels. For example, if the guitarist of the performing band wants to render the concert audio for his own review and analysis of his own performance, the guitar sound capturing channels are of highest priority for a guitar monitor mix he desires, and the sound of the crowd is less important but perhaps not subject to removal so the guitarist can hear any substantial changes in the crowd's reaction. In this example the drum and ambience channels can be prioritized lower than the guitar audio channel. In the coding for this example, the enhancement layers in an embedded scalable coding may be arranged such that layers relating to drum or ambience coding may be dropped while the enhancement layers relating to the guitar track are retained. Alternatively or additionally, the guitar track or tracks may be encoded separately whereas the drum and ambience tracks may be encoded jointly in order to save bit rate. It is the guitarist wishing to emphasize the guitar track that selects this feature on the user interface of his device when accessing the monitoring application 700, and this information is part of the feedback 710 shown at FIG. 4. This application-dependent adaptation therefore maintains the best possible quality for the most important content for a given rendering. Dropping some of these enhancement layers represents a further selection from the previously selected Y channels towards the finally selected X channels, where Y<X. In FIG. 5 the application-dependent prioritization is done by module 500, which may be physically disposed with the viewpoint/scene geometry selection prioritization device 400 or with the receiver-profile dependent coder 600 or separately from them both. Note that the number of channels may or may not be restricted further at this step; typically there may be some reduction but sometimes the application may not identify any further channels to drop or down-mix.

Figure 7:
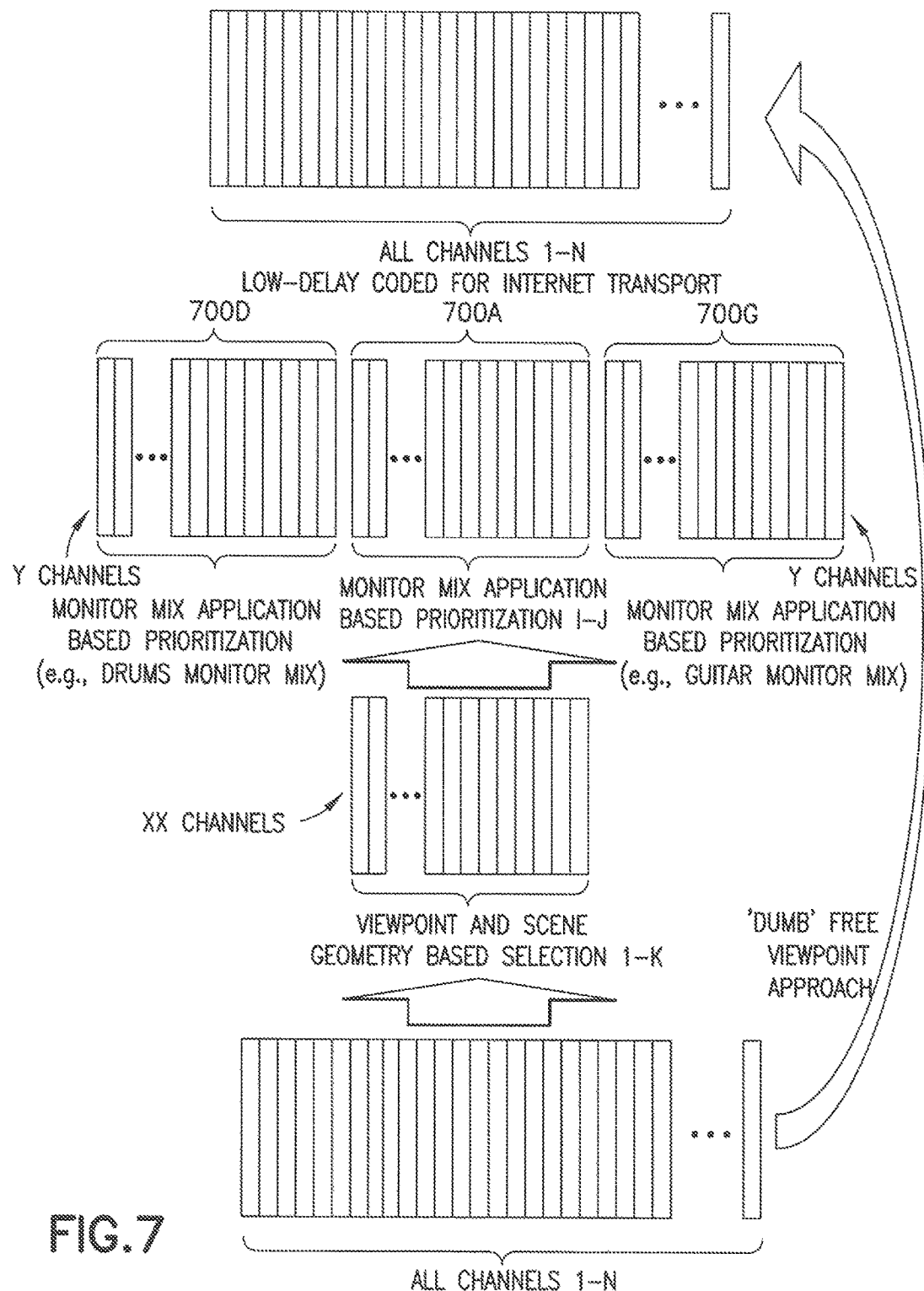
FIG. 7 is a conceptual view of channel selection and reduction according to viewpoint, observation point and user application according to an example embodiment of these teachings.

FIG. 7 illustrates a progression from N channels, to X channels based on the viewpoint and scene based selection, and then to Y channels based on the monitor mix application. FIG. 7 illustrates three different renderings from those same initially-selected X channels; one set 700D of Y channels is for a drum monitor mix, another set 700G of Y channels is for a guitar monitor mix as more fully detailed above, and a third set 700A is a more generic/non-specified monitor mix. While this description uses the variable Y to indicate the final number of channels that are coded and sent to the user device for the three different renderings, this does not imply that different monitor mixes from the same initially-selected X channels will always result in the same number of channels.

Table 3 presents an example of this application-dependent prioritization in which close-up microphone 3 (Mi-3) has been given top priority and is shown in bold; for this example assume this is the close-up microphone of the guitarist. Other embodiments may have further changes in this step, which may also drop unnecessary channels or down-mix very low priority ones when achieving the down-selection to Y<X channels.

TABLE 3

EXAMPLE CHANNEL PRIORITY

| Source | Priority | App. priority | Channels | Raw bit rate |
|--------|----------|---------------|----------|--------------|
| Mi-03  | 9        | 1             | 1        | 1152         |
| OP-6   | 1        | 2             | 8        | 9216         |
| OP-3   | 2        | 3             | 8        | 9216         |
| OP-7   | 3        | 4             | 8        | 9216         |
| Mi-08  | 4        | 5             | 1        | 1152         |
| Mi-01  | 5        | 6             | 1        | 1152         |
| Mi-02  | 6        | 7             | 1        | 1152         |
| Mi-05  | 7        | 8             | 1        | 1152         |
| Mi-09  | 8        | 9             | 1        | 1152         |
| Mi-04  | 10       | 10            | 1        | 1152         |
| OP-5   | 11       | 11            | 8        | 9216         |
| OP-4   | 12       | 12            | 8        | 9216         |
| OP-1   | 13       | 13            | 8        | 9216         |
| OP-2   | 14       | 14            | 8        | 9216         |
| Mi-07  | 15       | 15            | 1        | 1152         |
| Mi-06  | 16       | 16            | 1        | 1152         |
| Mi-10  | 17       | 17            | 1        | 1152         |
| TOTAL  |          |               | 66       | 76032        |

The third step is next and is the prioritization based on the receiver profile which takes into account the capabilities of the receiver in the monitoring device 700 for performing the joint coding. The monitoring device 700 is the end user device and its receiver bandwidth defines the bitrate available for the coded monitor mix. The latency requirements are substantially defined by the user experience requirements of the high performance augmented reality (AR) applications. The number of streams that are sent to the device 700 is further limited in some embodiments by the receiver device 700 computational and memory resources, of which the receiver device 700 can inform the system in its initial request message 710 when the session is being initiated.

An example of bitrate reduction in the third step is shown below at Table 4 which follows a simple three-level approach where each channel is separately encoded. In a specific non-limiting example the high-rate encoding is 256 kbits/s per channel and the low-rate encoding is 64 kbits/s per channel, as Table 4 shows for the close-in microphone channels Mi. In some embodiments latency may be considered in the bit rate reduction step in which case there may be a second high/low bitrate for the encoding for which each of these second high/low coding rates are higher than the respective high/low coding rate of the first/relaxed coding rate set to account for the loss of coding efficiency due to lower algorithmic delay. Table 4 shows for the OP audio streams the high bitrate of 2048 kbits/s and the low bitrate of 512 kbits/s based on eight (8) separate encodings at the single channel bitrates as shown for close-up microphone channels Mi. Each coding rate set also has at least one mid-range coding rate between the high and low rate limits for that set.

TABLE 4

EXAMPLE BIT RATES

| Source | Raw bit rate | High rate | Mid rate | Low rate |
|--------|--------------|-----------|----------|----------|
| Mi-01  | 1152         | 256       | 128      | 64       |
| Mi-02  | 1152         | 256       | 128      | 64       |
| Mi-03  | 1152         | 256       | 128      | 64       |
| Mi-04  | 1152         | 256       | 128      | 64       |
| Mi-05  | 1152         | 256       | 128      | 64       |
| Mi-06  | 1152         | 256       | 128      | 64       |
| Mi-07  | 1152         | 256       | 128      | 64       |
| Mi-08  | 1152         | 256       | 128      | 64       |
| Mi-09  | 1152         | 256       | 128      | 64       |
| Mi-10  | 1152         | 256       | 128      | 64       |
| OP-1   | 9216         | 2048      | 1024     | 512      |
| OP-2   | 9216         | 2048      | 1024     | 512      |
| OP-3   | 9216         | 2048      | 1024     | 512      |
| OP-4   | 9216         | 2048      | 1024     | 512      |
| OP-5   | 9216         | 2048      | 1024     | 512      |
| OP-6   | 9216         | 2048      | 1024     | 512      |
| OP-7   | 9216         | 2048      | 1024     | 512      |
| TOTAL  | 76032        | 16896     | 8448     | 4224     |

For simplicity of explanation the example at Table 4 assumes a fixed bit rate per channel and separately encoding each channel. The total bit rate can be further optimized by dispensing with one or both of these assumptions so that a variable bit rate can be used and/or multiple channels can be jointly coded, where the total bit rate may further depend on the relative importance of each channel. This feature can be exploited by the receiver profile dependent prioritization.

The prioritization information from the previous steps may be used to provide the desired number of individual channels in a way that fulfills the bit rate constraint. In practice, low-priority OZO/OP channels may be down-mixed for example to mono or stereo, and particularly low-priority channels that are spatially close to each other and that are not critical for timing may be jointly encoded to further reduce the number of channels and the associated bit rate. On the other hand, the priority signal(s) may be sent as raw data or encoded at a very high bit rate (approaching lossless quality) with low latency. In this manner the total coded monitor mix can be optimized for a particular bitrate-constrained receiver.

Consider a particular example consistent with Table 3 above in which the close-up microphone channel Mi-3 has been prioritized highest. Further assume the uplink bandwidth is 3000 kbits/s. Table 5 below presents an example bit allocation summary that utilizes the prioritization information for bit allocation of various channels and the downmixing and joint coding of the input channels to provide a good-quality monitoring experience. In total, Y=25 of the original 66 audio channels are transmitted and the most important components are maintained at high quality.

TABLE 5

EXAMPLE OF SOURCE DOWNMIXING, SELECTION, AND ENCODING

| Source | Channels | Downmix | Decision | Bit rate |
|---|---|---|---|---|
| Mi-03 | 1 | 1 | High rate | 256 |
| OP-6 | 8 | 4 | Joint, high | 512 |
| OP-3 | 8 | 4 | Joint, high | 512 |
| OP-7 | 8 | 4 | Joint, high | 512 |
| Mi-08 | 1 | 1 | High rate | 256 |
| Mi-01 | 1 | 1 | High rate | 256 |
| Mi-02 | 1 | 1 | Mid rate | 128 |
| Mi-05 | 1 | 1 | Mid rate | 128 |
| Mi-09 | 1 | 1 | Joint, mid | 112 |
| Mi-04 | 1 | 1 | | |
| OP-5 | 8 | 2 | Joint, mid | 112 |
| OP-4 | 8 | 2 | Joint, mid | 112 |
| OP-1 | 8 | 2 | Joint, low | 80 |
| OP-2 | 8 | 2 | Drop | — |
| Mi-07 | 1 | 1 | Drop | — |
| Mi-06 | 1 | 1 | Drop | — |
| Mi-10 | 1 | 1 | Drop | — |
| TOTAL | 66 | 30 | 25 chann. | 2976 |

In some embodiments, the number of rendering channels at the receiver device 700 may also be taken into account, and this information can be provided to the system in the feedback 710 (FIG. 5) along with the other receiver capabilities. In particular, a mono-only capable device in a very congested network may only receive a separate track/channel for the object of main interest and a jointly coded ambiance for everything else. This may still allow the user to directly control the relative level of each of the two components for the current listening position, although the rendering may be monaural.

The final step in the process is packetization and transport of the coded monitoring mix. The coded stream 610-1 and the associated metadata 610-2 consisting of the audio capture scene 610-3 from the chosen viewpoint of the coded audio channels is delivered to the device 700 as FIG. 5 illustrates. In some embodiments, the playback scene 610-3 can indicate the channels dropped, as well as those that were coded but not delivered due to bandwidth constraint and the rendered audio channels. This provides the means for the monitoring user to interactively modify not only the viewpoint but also to influence the monitor mix constitution via a continuing feedback 710 from the device 700.

In some embodiments the coded monitor mix can be re-transmitted from the user device 700 that originally received the monitor mix to another device 800 with re-prioritized audio channels 610-1' and mix parameters 610-2' as shown at FIG. 5. This provides a re-broadcasting capability for personalized broadcasting of a selectively coded free viewpoint mix.

Embodiments of these teachings provide a variety of technical effects. For example, they enable high quality low latency monitoring of complex audio capture scenes. This enables use cases such as live monitoring of free viewpoint capture, AR based media mixing and other such low latency scenarios. Certain embodiments enable resource constrained devices such as conventional mobile devices (smartphones, tablets) to monitor a distributed audio capture scene with a large number of channels. This provides flexibility to the users such as professionals, prosumers, end users to use low cost widely available mobile devices instead of depending on high cost professional devices. Certain embodiments enable end user monitoring over transmission links of conventional wireless IP networks. And the interactive selective coding of a free viewpoint audio scene takes into account application requirements at the user device to ensure the coded monitor mix contains the most important channels and the total number N of captured audio channels is "degraded" gracefully by dropping the least important channels and certain select channel enhancements first.

Figure 8:
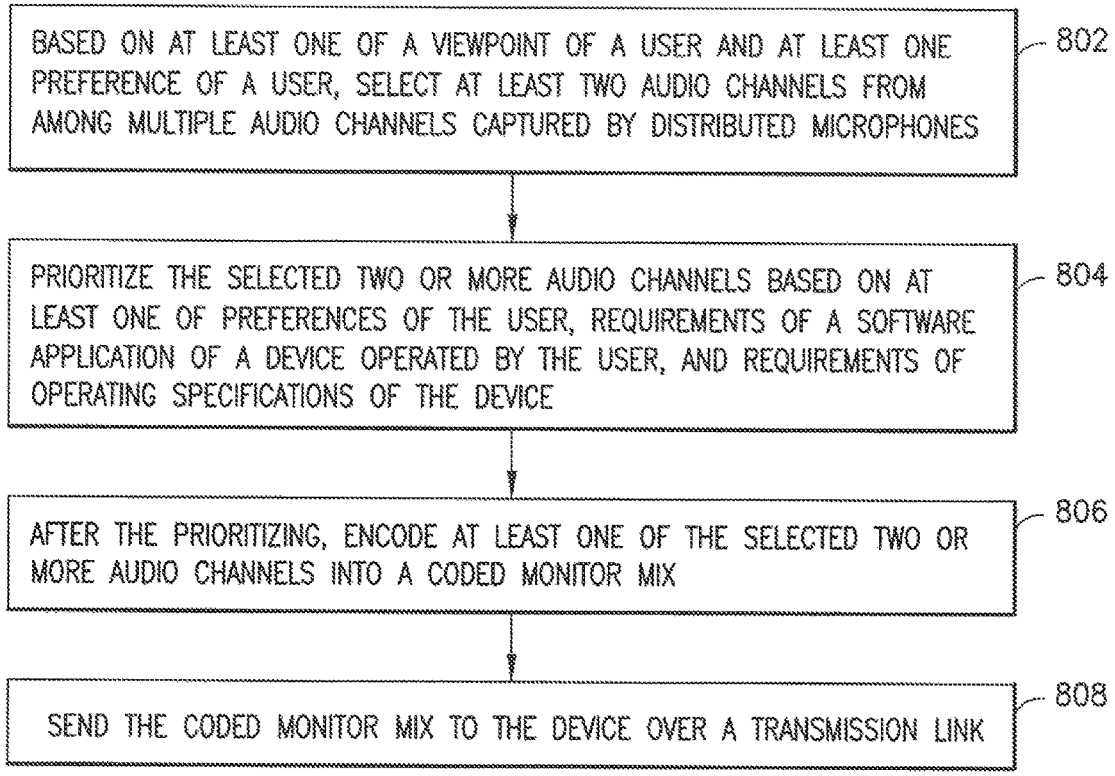
FIG. 8 is a process flow diagram summarizing certain of the above teachings.

FIG. 8 is a process flow diagram that summarizes some of the above aspects of these teachings. These steps may be performed by a single device such as a server or an audio apparatus/receiver at the concert hall or other venue, or they may be performed by multiple devices such as are shown at FIG. 5 for the different functions. However arranged the overall processing hardware and software forms an audio processing system. At block 802, based on at least one of a on a viewpoint of a user and preferences of a user, at least two audio channels are selected from among multiple audio channels that are captured by distributed microphones. These channels may be considered 'raw' audio, without any encoding so for example if a given microphone captures 24-bit audio at 48 kHz the corresponding audio channel selected at block 802 would typically be at the same sampling frequency and bit-depth, with little or no processing so as to represent the input audio or original audio captured at the various (individual and arrayed) distributed microphones. The user viewpoint can be a user listening point or an observation point the user selects, and the two or more selected channels is described in the above examples as the X channels that are selected from among the total number of N audio channels captured at the event/venue. In some embodiments the user's viewpoint is the virtual position of the user in the audio scene and also the user's viewing direction, which for example can be given by an augmented visual reality system such as a headset that monitors movement of the user's head so as to input the direction of the audio-visual scene in which the user is looking. FIG. 6 shows one example listening point 200 as the user's viewpoint but it could also be at any of the close-up microphone locations or even a location of one of the microphone arrays. The user's preferences are reviewed below. The channels that are selected may be all of the audio channels, only two of them, or some number in between. The minimum number of channels may depend on the density of microphones (total number of channels) and the significance of the sound source(s) that the user's viewpoint is capturing. It is anticipated that most deployments will have at least two channels selected at block 802. In some deployments, only one channel may be selected at block 802.

At block 804 the two or more audio channels selected at block 802 are prioritized based on user requirements/preferences, and/or based on the receiving audio device software application needs, and/or based on requirements of operating conditions of that user audio device. The software application may be the spatial audio processing software application such as the SAM mentioned above through which the user indicates his/her preferences and which determines the viewpoint which may change dynamically in some instances. If there is only one channel selected at block 802 this channel becomes the only channel in the priority list. If the viewpoint is selected based on the user's own preference (for example, the user's head movement as sensed by an augmented reality headset that delivers both audio and visual signals) and only one audio channel is selected based on that viewpoint then this is also the basis for the priority of that one channel. The user may indicate channel priority preferences in other ways, for example by selecting a guitar monitor mix where one of the microphones is disposed immediately adjacent to the guitar player in the band as mentioned above in which case this is a user preference that prioritizes that audio channel over and above it being included in the channels selected according to viewpoint. In some embodiments the user preference for one channel may also serve to implicitly de-prioritize another channel, for example selecting the guitar monitor mix may serve to prioritize the guitar microphone channel and de-prioritize the drum microphone channel. The above examples further described a subset of Y channels that are selected from among the X channels (two or more audio channels at block 802) and this selection of Y channels may be based on the priorities of block 804, meaning some further channels may or may not be dropped during the encoding step at block 806 where at least some of the prioritized channels are encoded into a coded monitor mix and the prioritizing of the selected two or more audio channels at block 804 may also be based on capabilities/requirements of operating specifications of the user device. As in the more detailed examples above, these requirements of operating specifications of the user device may be bandwidth restrictions imposed by the device for the network/radio access technology over which the monitor mix is to be sent that drive some of the decisions as to what bit rates to use, whether to jointly encode channels, and the like. These bandwidth constraints often overlap, and there may be other resource user device operating specification requirements apart from bandwidth that are particular to the specific user device such as processing capacity, number of audio channels it can handle simultaneously, and the like. Typically these decisions on resource constraints/operating specification requirements will drive whether further channels of the prioritized list are to be dropped from inclusion in the final monitor mix that is to be delivered to the user.

Finally at block 808 the coded monitor mix is sent to the user device over a transmission link. There may be associated metadata sent with the monitor mix and in some examples detailed above this metadata concerns the prioritized channels that are included in the coded monitor mix, but some embodiments have additional metadata. The coded monitor mix may include a combination of raw and encoded channels, or only one or more encoded channels, and as detailed above is constructed so as to match the user requirements and resource constraints/operating specifications whether those constraints/specifications are due to transmission link/network or user device bandwidth limits, user device processing capacity, and the like.

In the above examples some of the operating specification requirements of the user device on which the priorities are assigned include at least one of bandwidth and number of rendering channels.

In other embodiments detailed above the coded monitor mix is sent to the user device at block 808 of FIG. 8, along with associated metadata that indicates which of the multiple audio channels (which of the N audio channels in the above detailed examples) are included within the monitor mix. Some of those examples also have the associated metadata further indicating which of the multiple audio channels are not included in the coded monitor mix.

In some embodiments some the multiple audio channels are from arrayed microphones (the OP channels above) and others of the multiple audio channels are from non-arrayed microphones (the Mi channels above), and assigning the priorities as at block 804 separately prioritizes the arrayed microphones in a first group and the non-arrayed microphones in a second group.

In other embodiments detailed above, during the encoding step but prior to the actual encoding of channels, at least some of the selected two or more audio channels that are relatively low priority and that originate from a same microphone array are down-mixed to a fewer number of channels, for example 8 channels down-mixed to binaural or mono. In other embodiments the encoding at block 806 includes jointly encoding at least some of the relatively lower priority channels and not jointly encoding at least some of the relatively higher priority channels.

Figure 9:
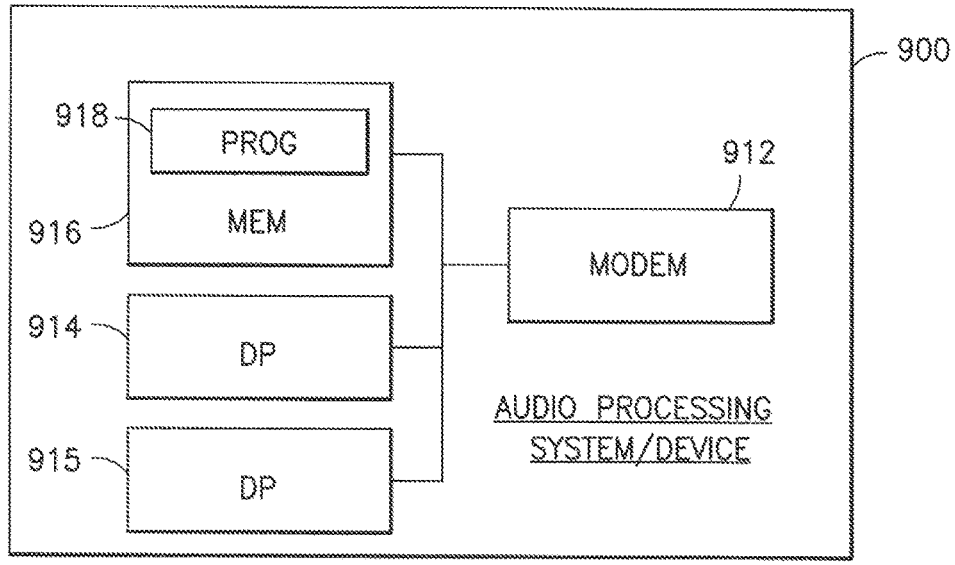
FIG. 9 is a high level schematic block diagram illustrating an apparatus/device that is suitable for practicing certain of these teachings, and may be implemented as multiple processing devices such as those shown at FIG. 5.

FIG. 9 is a high level diagram illustrating some relevant components of an audio processing device or system 900 that may implement various portions of these teachings. The audio processing device/system 900 includes a controller, such as a computer or a data processor (DP) 914 (or multiple ones of them), a computer-readable memory medium embodied as a memory (MEM) 916 (or more generally a non-transitory program storage device) that stores a program of computer instructions (PROG) 918, and a suitable wireless interface, such as a modem 912 that may or may not have a wireless radio itself since the wireless communication may be after the monitoring mix is sent. In general terms the audio processing device/system 900 can be considered a machine that reads the MEM/non-transitory program storage device and that executes the computer program code or executable program of instructions stored thereon. While the entity of FIG. 9 is shown as having one MEM, in practice each may have multiple discrete memory devices and the relevant algorithm(s) and executable instructions/program code may be stored on one or across several such memories.

The PROG 918 is assumed to include program instructions that, when executed by the associated one or more DPs 914, enable the device 900 to operate in accordance with exemplary embodiments of this invention. That is, various exemplary embodiments of this invention may be implemented at least in part by computer software executable by the DP 914 of the audio processing device/system 900; and/or by hardware, or by a combination of software and hardware (and firmware). Note also that the audio processing device/system 900 may also include dedicated processors 915. The electrical interconnects/busses between the components at FIG. 9 are not separately labelled.

The computer readable MEM 916 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 914, 915 may be of any type suitable to the local technical environment, and may include one or more of general purpose computers, special purpose computers, microprocessors, digital signal processors (DSPs), audio processors and processors based on a multicore processor architecture, as non-limiting examples. The modem 912 may be of any type suitable to the local technical environment and may be implemented using any suitable communication technology.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   based on at least one of: a viewpoint of a user; and at least one preference of a user, selecting two or more audio channels from among multiple audio channels captured with distributed microphones;
   prioritizing the selected two or more audio channels based on at least one of preferences of the user, requirements of a software application of a device operated by the user, and requirements of operating specifications of the device, wherein the at least one preference is an intended application;
   after the prioritizing, encoding at least one of the selected two or more audio channels into a coded monitor mix; and
   sending the coded monitor mix to the device over a transmission link.

2. The method according to claim 1, wherein the prioritizing is based on the requirements of operating specifications of the device to include at least one of bandwidth and number of rendering channels.

3. The method according to claim 1, wherein the coded monitor mix is sent to the device with associated metadata that indicates at least which of the multiple audio channels are included in the coded monitor mix.

4. The method according to claim 3, wherein the associated metadata further indicates which of the multiple audio channels are not included in the coded monitor mix.

5. The method according to claim 1, wherein some of the multiple audio channels are from arrayed microphones and others of the multiple audio channels are from non-arrayed microphones, and wherein the prioritizing separately prioritizes the arrayed microphones in a first group and the non-arrayed microphones in a second group.

6. The method according to claim 1, wherein the two or more audio channels are selected based on contextual information of an audio scene recorded on the multiple audio channels.

7. The method according to claim 1, wherein prior to the encoding, at least some of the prioritized channels that are relatively low priority and that originate from a microphone array are downmixed to a fewer number of channels.

8. The method according to claim 7, wherein the encoding comprises jointly encoding at least some of the lower priority channels and not jointly encoding at least some of the higher priority channels.

9. An audio processing system comprising:
   at least one memory storing computer program instructions, and
   at least one processor;
   wherein the at least one memory with the computer program instructions is configured with the at least one processor to cause the audio processing system to perform actions comprising
   based on at least one of: a viewpoint of a user; and at least one preference of a user, select two or more channels from among multiple audio channels captured with distributed microphones;
   prioritize the selected two or more audio channels based on at least one of preferences of the user, requirements of a software application of a device operated by the user, and requirements of operating specifications of the device, wherein the at least one preference is an intended application;
   after the selected two or more channels are prioritized, encode at least one of the selected two or more audio channels into a coded monitor mix; and
   send the coded monitor mix to the device over a transmission link.

10. The audio processing system according to claim 9, wherein the selected two or more audio channels are prioritized based on the requirements of operating specifications of the device.

11. The audio processing system according to claim 9, wherein the coded monitor mix is sent to the device with associated metadata that indicates at least which of the multiple, audio channels are included in the coded monitor mix.

12. The audio processing system, according to claim 11, wherein the associated metadata further indicates which of the multiple audio channels are not included in the coded monitor mix.

13. The audio processing system according to claim 9, wherein some of the multiple audio channels are from arrayed microphones and others of the multiple audio channels are from non-arrayed microphones, and wherein the prioritizing the channels separately prioritizes the arrayed microphones in a first group and the non-arrayed microphones in a second group.

14. The audio processing system according to claim 9, wherein the two or more audio channels are selected based on contextual information of an audio scene recorded on the multiple audio channels.

15. The audio processing system according to claim 9, wherein prior to the encoding, at least some of the prioritized channels that are relatively low priority and that originate, from a microphone array are downmixed to a fewer number of channels.

16. The audio processing system according to claim 15, wherein the encoding comprises jointly encoding at least some of the lower priority channels and not jointly encoding at least some of the higher priority channels.

17. A computer readable memory tangibly storing computer program instructions that, when executed using one or more processors, cause a host audio system to perform actions comprising:
- based on at least one of: a viewpoint of a user; and at least one preference of a user, select two or more audio channels from among multiple audio channels captured with distributed microphones;
- prioritize the selected two or more audio channels based on at least one of preferences of the user, requirements of a software application of a device operated by the user, and requirements of operating specifications of the device, wherein the at least one preference is an intended application;
- after the selected two or more audio channels are prioritized, encode at least one of the selected two or more audio channels into a coded monitor mix; and
- send the coded monitor mix to the device over a transmission link.

18. The computer readable memory according to claim 17, wherein the selected two or more audio channels are prioritized based on the requirements of operating specifications.

19. The computer readable memory according to claim 17, wherein the coded monitor mix is sent to the device with associated metadata that indicates at least which of the multiple audio channels are included in the coded monitor mix.

20. The computer readable memory according to claim 17, wherein at least one of:
- prior to the encoding, at least some of the prioritized channels that are relatively low priority and that originate from a microphone array are downmixed to a fewer number of channels; and
- the encoding-comprises jointly encoding at least some of the relatively lower priority channels and not jointly encoding at least some of the relatively higher priority channels.

* * * * *